United States Patent
De Vincent (10) Patent No.: US 11,437,832 B1
(45) Date of Patent: Sep. 6, 2022

(54) WALL MOUNTED CELLPHONE HOLDER

(71) Applicant: Arthur De Vincent, Fort Lauderdale, FL (US)

(72) Inventor: Arthur De Vincent, Fort Lauderdale, FL (US)

( * ) Notice: Subject to any disclaimer, the term of this patent is extended or adjusted under 35 U.S.C. 154(b) by 413 days.

(21) Appl. No.: 16/702,729

(22) Filed: Dec. 4, 2019

(51) Int. Cl.
H02J 7/00 (2006.01)
A47B 5/00 (2006.01)
H04M 1/04 (2006.01)
A47B 21/06 (2006.01)

(52) U.S. Cl.
CPC .............. *H02J 7/0044* (2013.01); *A47B 5/00* (2013.01); *A47B 21/06* (2013.01); *H04M 1/04* (2013.01); *A47B 2021/066* (2013.01); *A47B 2200/0082* (2013.01)

(58) Field of Classification Search
CPC ..... A47B 5/00; A47B 21/06; A47B 2021/066; H02J 7/0044; H04M 1/04
USPC ................. 108/42, 50.02; 320/114
See application file for complete search history.

(56) References Cited

U.S. PATENT DOCUMENTS

| | | | | |
|---|---|---|---|---|
| 5,673,632 A * | 10/1997 | Sykes | ..................... | A47B 21/06 108/50.02 |
| 5,901,513 A * | 5/1999 | Mollenkopf | ........... | A47B 21/06 312/196 |
| 6,711,921 B1 * | 3/2004 | Yang | ..................... | G06F 1/1632 70/159 |
| 7,163,409 B1 * | 1/2007 | Chen | .................... | H01R 25/006 439/131 |
| 10,084,499 B2 * | 9/2018 | Bacallao | ............... | H04B 1/3877 |
| 10,281,083 B2 * | 5/2019 | Bacallao | ................ | F16M 13/02 |
| 2012/0246868 A1 * | 10/2012 | Hunt | ...................... | H02G 3/185 16/2.1 |
| 2016/0095433 A1 * | 4/2016 | Cho | ...................... | A47B 87/002 108/50.02 |
| 2018/0034494 A1 * | 2/2018 | Bacallao | ............... | H04B 1/3877 |
| 2018/0197389 A1 * | 7/2018 | Grant | .................. | G08B 13/1445 |
| 2022/0034445 A1 * | 2/2022 | Hung | ....................... | A47B 5/00 |
| 2022/0069598 A1 * | 3/2022 | Hobbs | ................. | H01M 50/204 |

* cited by examiner

*Primary Examiner* — Jose V Chen
(74) *Attorney, Agent, or Firm* — Sanchelima & Associates, P.A.; Christian Sanchelima; Jesus Sanchelima (57) ABSTRACT

A wall mounted cell phone holder including a shelf assembly and a cover assembly configured to be mounted to a wall is disclosed herein. The cover assembly of the body assembly is semi-cylindrical in shape and is used to cover a wall outlet of a wall to hide the mess of wires caused by cell phone chargers. The cover assembly attaches to the shelf assembly and is easily removable through a locking mechanism mounted thereon. Additionally, the shelf assembly is mounted directly onto a wall using threaded fasteners. Furthermore, the shelf assembly is of a suitable size to hold up to three cellphones, thereby providing a user with an organized method of charging phones. The shelf assembly further includes a hole that receives cellphone charging wires therethrough to provide a user with optimal wire management when charging cellphones.

11 Claims, 8 Drawing Sheets

WALL MOUNTED CELLPHONE HOLDER

BACKGROUND OF THE INVENTION

1. Field of the Invention

The present invention relates to cellphone holder and, more particularly, to a wall mounted cellphone holder that allows a user to mount multiple cellphones for charging while maintaining an organized cable environment near the outlet.

2. Description of the Related Art

Several designs for a wall mounted cellphone holder have been designed in the past. None of them, however, include a cell phone holder and charging device which is mounted to a wall. It is known that individuals carry around cellular devices that often need to be charged. It is also known that cellphone chargers tend to have a messy configuration. Especially when multiple users are charging their phones at one outlet, the wires of all the cellphone charges can often be extremely cumbersome. Therefore, there is a need for a wall mounted cellphone holder to provide a user with a method of charging phones in an organized manner and hides the mess caused by cellphone chargers. The present invention resolves this issue by providing a wall mounted cell phone holder including a body portion that is attached to the mounted holder and is easily removable and further hides the wires and adapters from cellphone chargers. The present invention provides a user with an organized way to charge cellphones.

Applicant believes that a related reference corresponds to U.S. Pat. No. 10,281,083B2 for a mobile computing device holder that mounts to a wall. The mobile computing device holder holds a mobile computing device base, such as a docking station or charger. The mobile computing device base cradles a mobile computing device such as a smart phone or scanning device. The mobile computing device holder includes a wall mount fixture that mounts to the wall and holds the mobile computing device base. However, it differs from the present invention because the U.S. Pat. No. 10,281,083B2 reference fails to address the issue of holding multiple phones at once. The reference additionally has a complicated configuration and fails to hide any of the wires and adapters caused by cellphone chargers. The present invention addresses these issues by providing a wall mounted cell phone holder that provides a user with an organized way of charging multiple cellphones at once while hiding the mess of wires caused by cell phone chargers.

Other documents describing the closest subject matter provide for a number of more or less complicated features that fail to solve the problem in an efficient and economical way. None of these patents suggest the novel features of the present invention.

SUMMARY OF THE INVENTION

It is an objective of the present invention to provide a wall mounted cellphone holder to give a user a method of charging phones in an organized manner and hides the mess caused by cellphone chargers.

It is one of the objects of the present invention to provide a wall mounted cellphone holder to allow a user to charge multiple cellphone at once, thereby saving space near an outlet.

It is another object of this invention to provide a wall mounted cell phone holder configured to hide the wires and adapters included with cellphone charges thereby creating an organized environment for charging phone.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
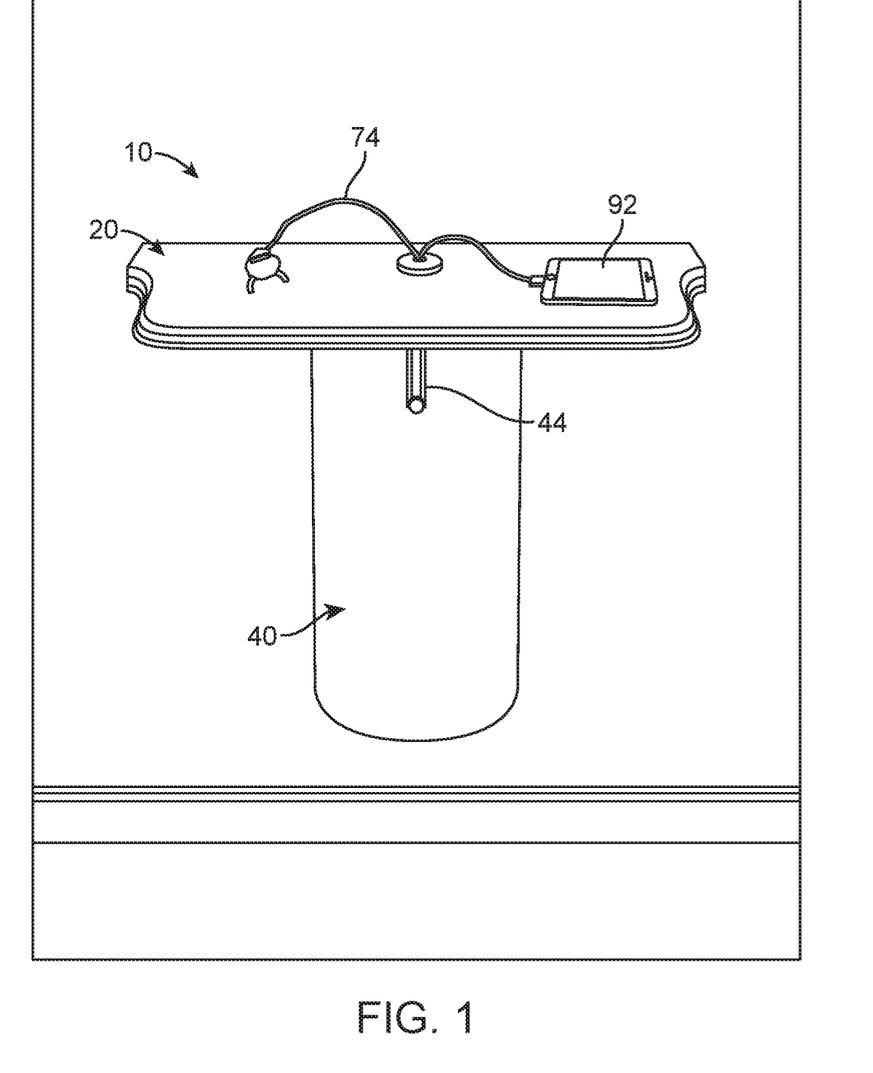
FIG. 1 represents an isometric view of wall mounted cell phone holder 10 in its operational setting in accordance to an embodiment of the present invention.

Referring now to the drawings, where the present invention is generally referred to with numeral 10, it can be observed a wall mounted cellphone holder 10 that includes a shelf assembly 20 and a cover assembly 40.

Figure 2:
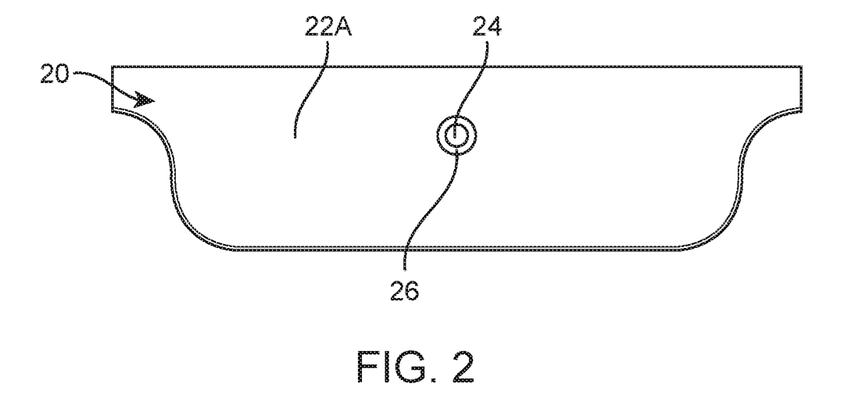
FIG. 2 shows a top view of shelf assembly 20 in accordance to an embodiment of the present invention.
Figure 3:
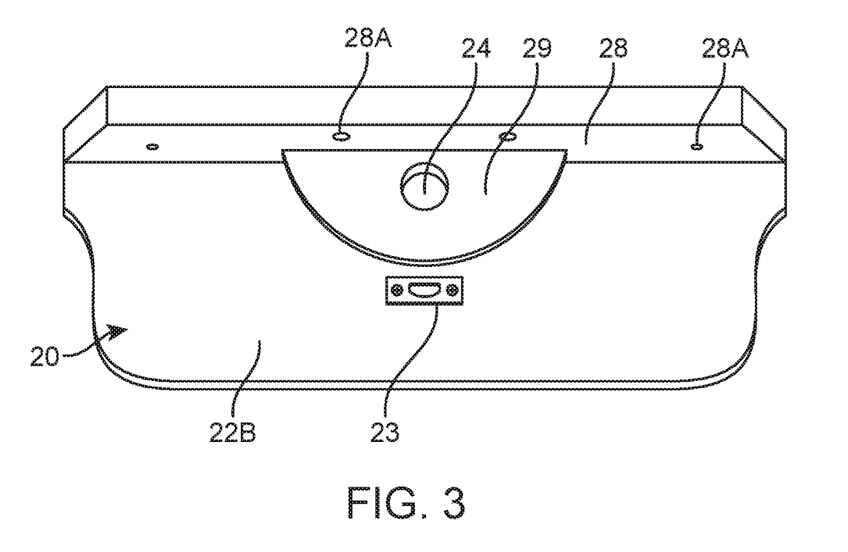
FIG. 3 illustrates an isometric bottom view of shelf assembly 20 in accordance to an embodiment of the present invention.
Figure 4:
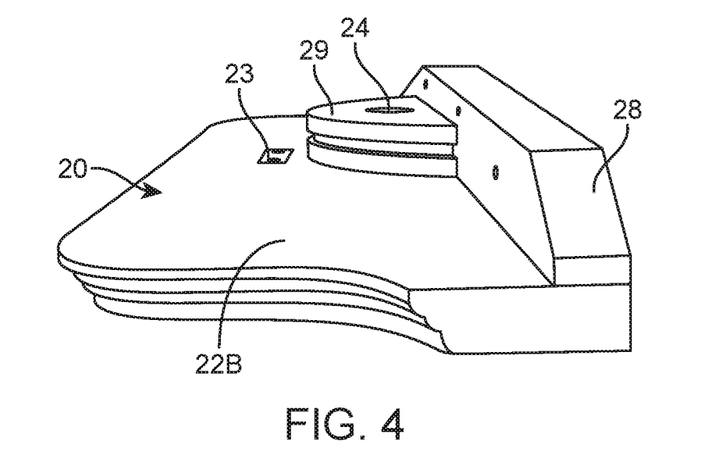
FIG. 4 is a representation of a side view of shelf assembly 20 in accordance to an embodiment of the present invention.
Figure 5:
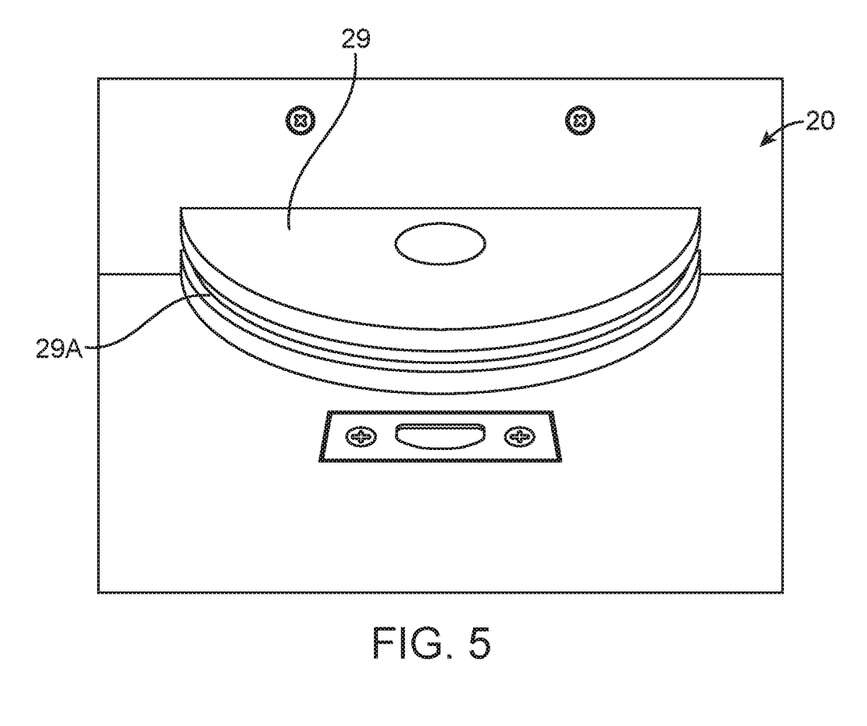
FIG. 5 shows an elevated view of shelf assembly 20 depicting groove 29A of protrusion 29.

Shelf assembly 20 includes a shelf 22 having a top end 22A and a bottom end 22B. In one embodiment, shelf 22 may have a substantially rectangular shape. Additionally, shelf 22 may be made of any suitable material such as wood, plastic, metal, and the like. It should be understood, that additional embodiments may include shelf 22 having different variations of shapes and materials. Additionally, top end 22A should be a flat top end having a suitable area to rest a mobile device 92 thereon. Furthermore, any number of mobile devices may be placed on top end 22A. Top end 22A further includes a cable opening 24 being circular in shape.

Cable opening 24 may extend from top end 22A all the way through to bottom end 22B and through a protrusion 29. Cable opening 24 may be of a suitable diameter to fit wires 74 of a charging adapter 74. Additionally, cable opening 24 may further include a grommet 26 surrounding the outer surface of cable opening 24. Grommet 26 may be a circular member encircling the circumference of cable opening 24. Furthermore, grommet 26 may be made of a plastic or any other suitable material. Grommet 26 aids in neatly organizing wires 74 passing through cable opening 24. Bottom end 22B of shelf 22 may further include a mounting sidewall 28 extending vertically from a side of shelf 22. In one embodiment, mounting sidewall 28 may be trapezoidal in shape and provided as integral part of shelf 22. Mounting sidewall 28 is used to mount shelf 22 to a wall 52. Mounting sidewall 28 may further include sidewall openings 28A and threaded fasteners 28B. Sidewall openings 28A may be spaced evenly in a predetermined configuration along mounting sidewall 28. Furthermore, sidewall openings 28A receive threaded fasteners 28B to then be threaded into wall 52. As a result, shelf 22 is securely mounted to wall 52. Additionally, bottom end 22B may further include a protrusion 29 being semicircular in shape. Additionally, cable opening 24 may extend entirely through protrusion 29 in an embodiment of the present invention. In one embodiment, protrusion 29 further includes a groove 29A extending within. Groove 29A is an inner channel that may extend around the entire length of protrusion 29. Protrusion 29 may further be configured to receive cover assembly 40 and remain entirely therein. In one embodiment, bottom end 22B may further include a locking member 23 located near protrusion 29. Additionally, locking member 23 may be a rectangular metal plate having an opening.

Figure 6:
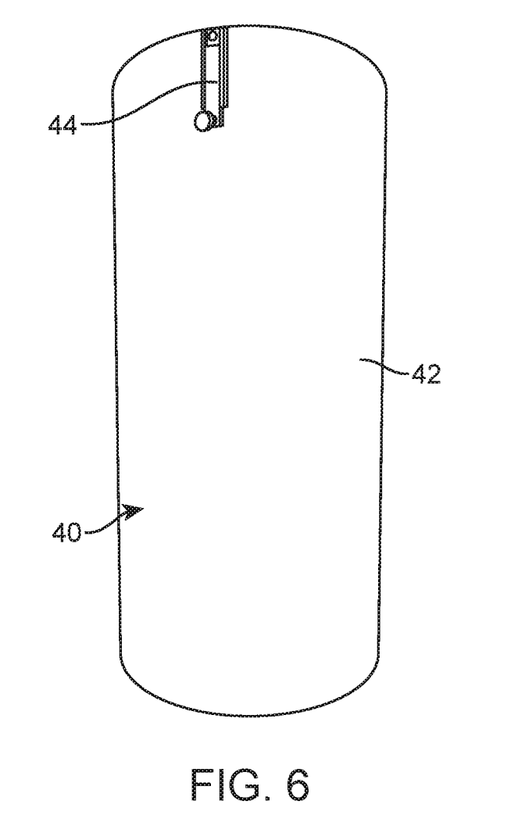
FIG. 6 illustrates an isometric front view of cover assembly 40 in accordance to an embodiment of the present invention.

Cover assembly 40 includes cover body 42 having a hollow portion 42A therein. In one embodiment cover body 42 is made of the same material as that of shelf 22. Additionally, cover body 42 may further have a semi-cylindrical shape. Although, it should be understood that other embodiments may include cover body 42 having different shapes other than semi-cylindrical. Cover body 42 may further include a locking mechanism 44 mounted on a top end. In one embodiment, cover assembly 40 is mounted to shelf assembly 20 and is easily removeable. Additionally, locking mechanism 44 is received and locked thereon to locking member 23 to create a secure attachment. As a result, cover assembly 40 is securely mounted to shelf assembly 20. In one embodiment, locking mechanism 44 may be a surface bolt that is then received by locking member 23. However, other embodiments may use other variations of locking mechanisms as known in the art.

Figure 7:
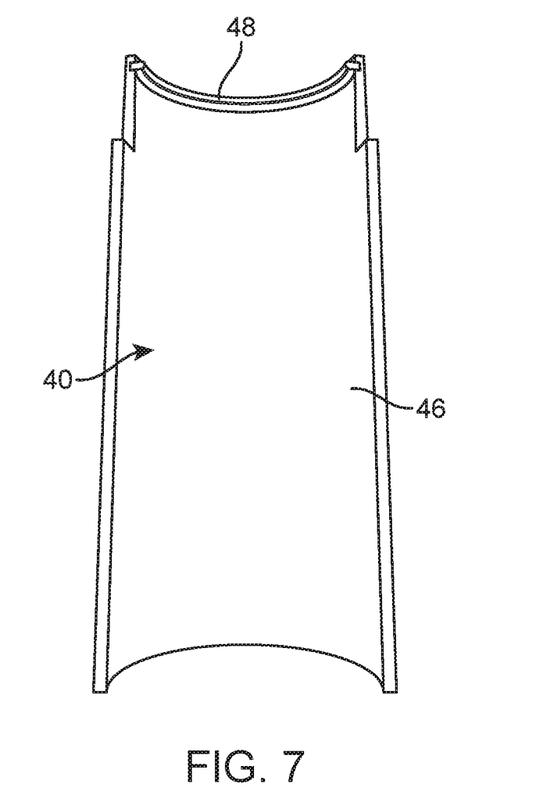
FIG. 7 represents a view of back side 46 of cover assembly 40 depicting the location of tongue 48 in accordance to an embodiment of the present invention.
Figure 8:
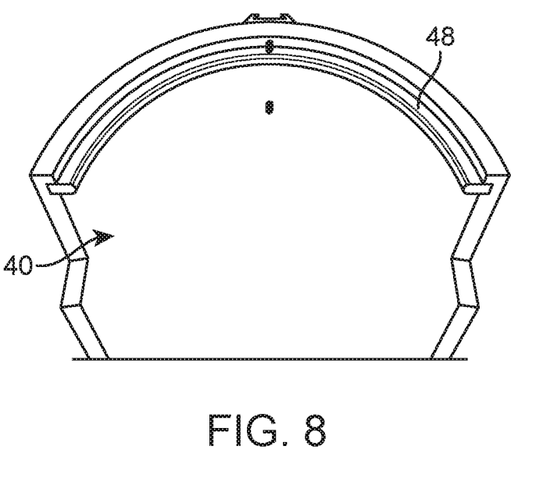
FIG. 8 shows an enlarged view of backside 46 of cover assembly 40 depicting tongue 48 in accordance to an embodiment of the present invention.

Cover body 42 further includes a back side 46 including a tongue 48 mounted thereon. In one embodiment, tongue 48 is a protrusion located near a topmost end of back side 46. Additionally, tongue 48 may be configured to extend the entire inner diameter of back side 46. Furthermore, tongue 48 may then be received by groove 29A to create a secure attaching means. In one embodiment, tongue 48 and groove 29A have the same length. In the present embodiment, the locking means of tongue 48 and groove 29A create such an attachment that locking mechanism 44 may be omitted from cover assembly 40.

Figure 9:
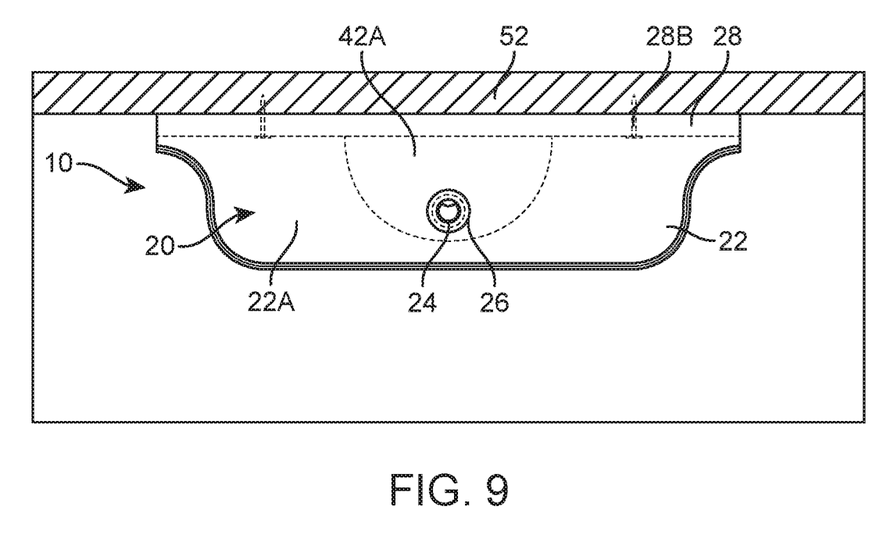
FIG. 9 illustrates a top view of wall mounted cell phone holder 10 mounted to a wall 52.
Figure 10:
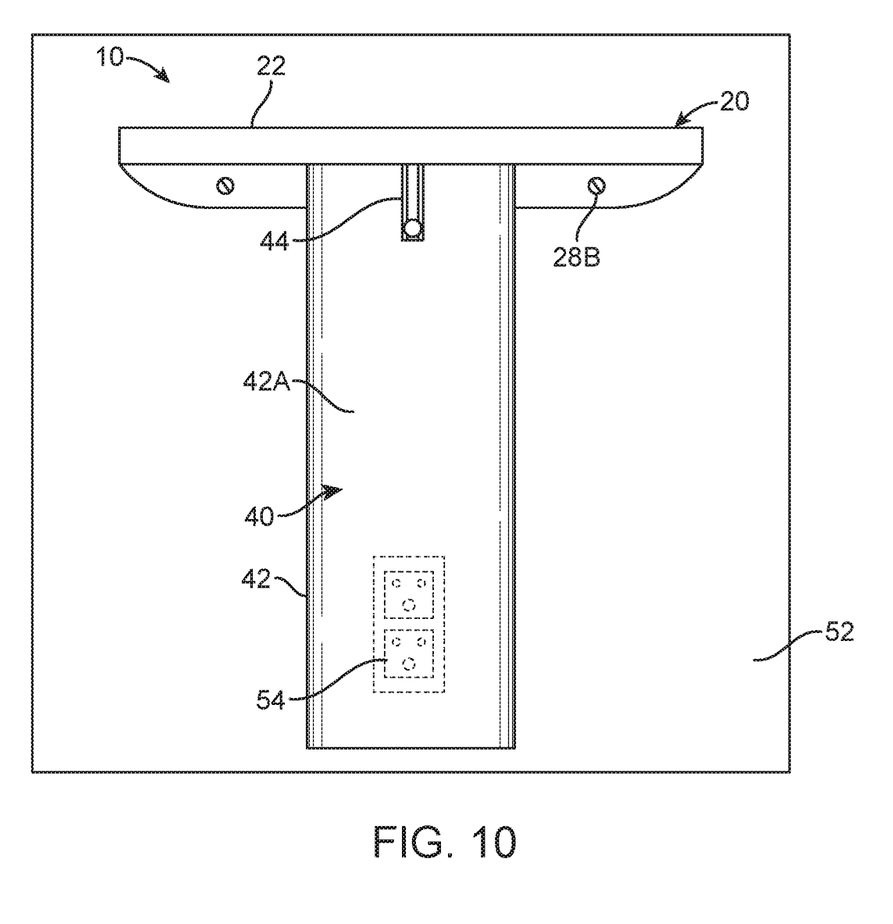
FIG. 10 represents a front view of wall mounted cell phone holder 10 mounted to a wall 52 and covering an outlet 54.
Figure 11:
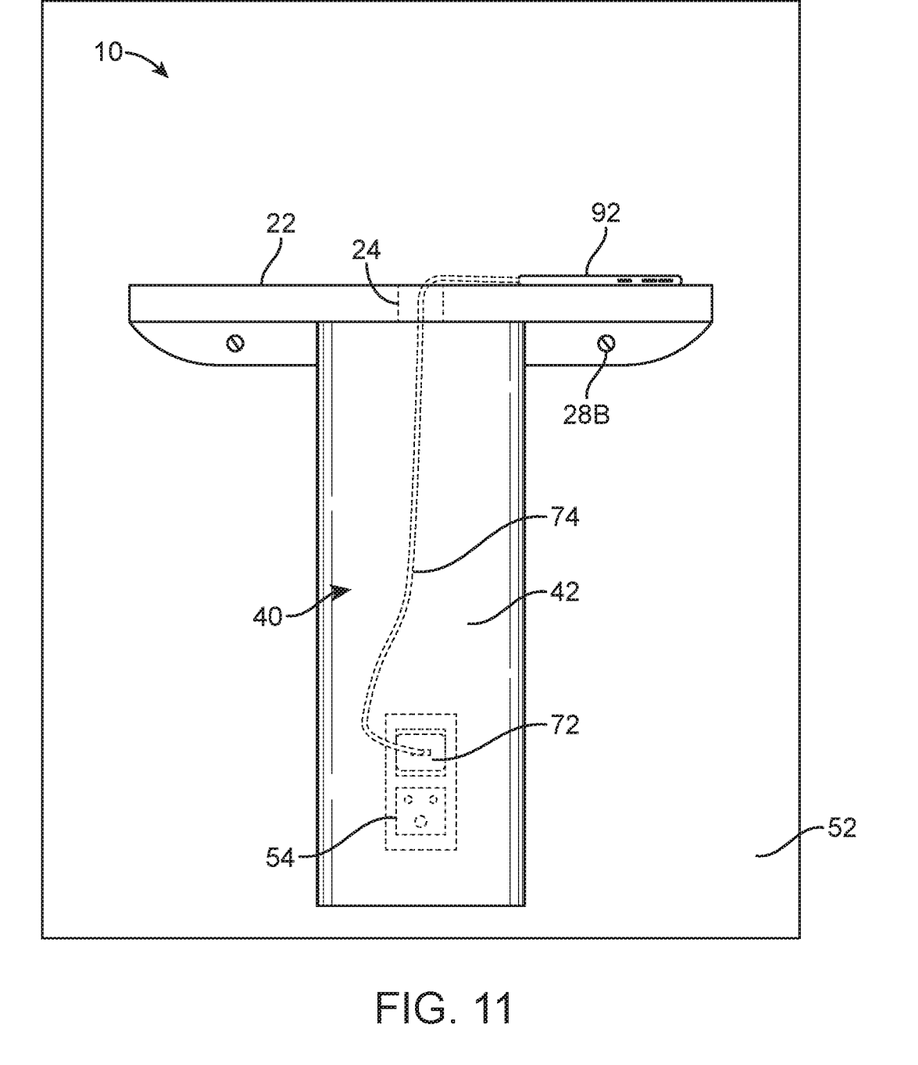
FIG. 11 shows a front view of wall mounted cell phone holder 10 covering a charging adapter 72 having wires 74 connected to a mobile device 92.

In one embodiment, cover assembly 40 is mounted to shelf 22 flush with a wall 52 to cover an outlet 54. Additionally, outlet 54 may further include a charging adapter 72 having wires 74 mounted thereon. In one embodiment, cover assembly 40 is adapted to fully cover outlet 54 having charging adapter 72. It should be understood, that cover body 42 should be configured to be a suitable size to cover outlet 54 and charging adapter 72. As a result, an aesthetically pleasing environment is created for a wall 52. An environment that covers wires 74 to create an aesthetically pleasing sight to a user. Additionally, wires 72 are then fed through cable opening 24 of shelf assembly 20. A user may then connect mobile devices 92 to wires 74 in order to provide charge. Furthermore, mobile devices 92 may then be rested on top end 22A of shelf 22. Wall mounted cell phone holder 10 provides a user with the most optimal configuration of obscuring wires for charging a mobile device and additionally creates an aesthetically pleasing charging environment for mobile devices.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a wall mounted cellphone holder, comprising:
   a. a shelf assembly including a shelf having a substantially rectangular shape, said shelf further including a top end and a bottom end, wherein said top end includes a cable opening extending to said bottom end of said shelf, wherein said cable opening is circular in shape and further including a grommet surrounding said cable opening, wherein said bottom end of said shelf further includes a mounting sidewall extending vertically from a side of said shelf, wherein said mounting sidewall is trapezoidal in shape, wherein said mounting sidewall further includes sidewall openings to receive a threaded fastener therein, said bottom end further includes a protrusion being semi-circular in shape, wherein said cable opening extends through said protrusion, wherein said protrusion further includes a groove extending a predetermined amount within said protrusion, wherein said bottom end further includes a locking member is located next to said bottom end near said protrusion; and
   b. a cover assembly including a cover body having a semi-cylindrical shape, wherein said protrusion of said shelf assembly is configured to accept said cover assembly by a locking mechanism that is received and locked to said locking member, wherein said cover body has a hollow portion therein, wherein said cover body further includes the locking mechanism mounted on a top end of said cover body, wherein said locking mechanism is received by said locking member, wherein said cover body further includes a back side having a tongue located thereon, wherein said tongue is located near a top most end of said back side, wherein said tongue extends a entire diameter of said back side, wherein said cover assembly is mounted to said shelf assembly, wherein said tongue of said cover body is received and mounted within said groove of said protrusion, wherein said cover body is mounted to a wall to cover a wall outlet, wherein said wall outlet includes a charging adapter having wires mounted thereon, wherein said wires are fed through said cable opening of said shelf, wherein said cover assembly and said shelf are configured to hide said wires of said charging adapter therein.

2. The system for a wall mounted cellphone holder of claim 1 wherein said locking member is a rectangular metal plate having a locking member opening.

3. The system for a wall mounted cellphone holder of claim 1 wherein said locking mechanism is a surface bolt.

4. The system for a wall mounted cellphone holder of claim 1 wherein said shelf further includes a mobile device placed thereon and connected to said wires for charging.

5. The system for a wall mounted cellphone holder of claim 1 wherein said grommet extends beyond the diameter of said cable opening of said shelf.

6. The system for a wall mounted cellphone holder of claim 1 wherein said shelf and said cover body are made of a plastic or wooden material.

7. The system for a wall mounted cellphone holder of claim 1 wherein said cover assembly is mounted to said shelf assembly and is configured to be easily removable.

8. The system for a wall mounted cellphone holder of claim 1 wherein said cover body is of a suitable size to entirely obscure said charging adapter and said wires from being in sight of a user.

9. The system for a wall mounted cellphone holder of claim 1 wherein the shape of said protrusion cooperates with the shape of said hollow portion of said cover body.

10. The system for a wall mounted cellphone holder of claim 1 wherein said groove extends the entire diameter of said protrusion.

11. A system for a wall mounted cellphone holder, comprising:
   a. a wall, including a wall outlet;
   b. a charging adapter, including wires;
   c. a mobile device;
   d. a shelf assembly including a shelf, said shelf further includes a top end and a bottom end, wherein said top end includes a cable opening extending to said bottom end of said shelf, wherein said cable opening is circular in shape and further including a grommet surrounding said cable opening, wherein said bottom end of said shelf further includes a mounting sidewall extending vertically from a side of said shelf, wherein said mounting sidewall is trapezoidal in shape, wherein said mounting sidewall further includes sidewall openings to receive a threaded fastener therein, wherein said threaded fasteners extend through said mounting sidewall and said wall, said bottom end further including a protrusion being semi-circular in shape, wherein said cable opening extends through said protrusion, wherein said bottom end further includes a locking member is located next to said bottom end near said protrusion, wherein said protrusion further includes a groove extending along an entire diameter of said protrusion and further extends within said protrusion, wherein said locking member is a rectangular metal plate having a locking member opening; and
   e. a cover assembly including a cover body having a semi-cylindrical shape, wherein said protrusion of said shelf assembly is configured to receive said cover assembly by a locking mechanism that is received and locked to said locking member, wherein said cover body has a hollow portion therein, wherein said cover body further includes the locking mechanism mounted on a top end of said cover body, wherein said locking mechanism is a surface bolt, wherein said locking mechanism is received by said locking member, wherein said cover body further includes a back side having a tongue located thereon, wherein said tongue is located near a top most end of said back side, wherein said tongue extends the entire diameter of said back side, wherein said shelf assembly is removably mounted on top of said cover assembly, wherein said tongue of said cover body is mounted within said groove of said protrusion, wherein said cover body is mounted flush with said wall to cover said wall outlet, wherein said wall outlet includes said charging adapter having wires mounted thereon, wherein said wires are fed through said cable opening of said shelf, wherein said cover assembly and said shelf are configured to hide said wires of said charging adapter therein, wherein said mobile device is placed on top of said shelf and connected to said wires for charging.

\* \* \* \* \*